May 15, 1962  W. W. WOLFE ETAL  3,034,237
MULTI-FUNCTION ATTACHMENTS CARRIER FOR FARM
LOADERS AND THE LIKE
Original Filed March 26, 1956
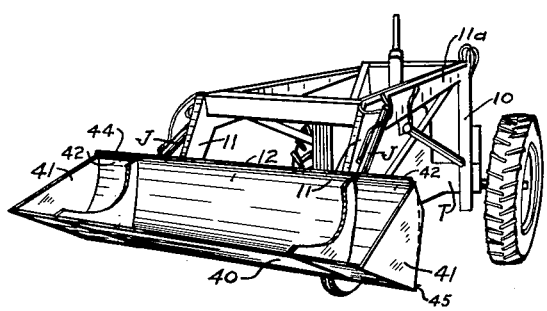
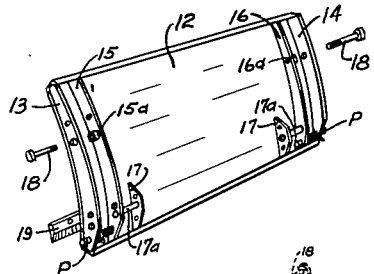
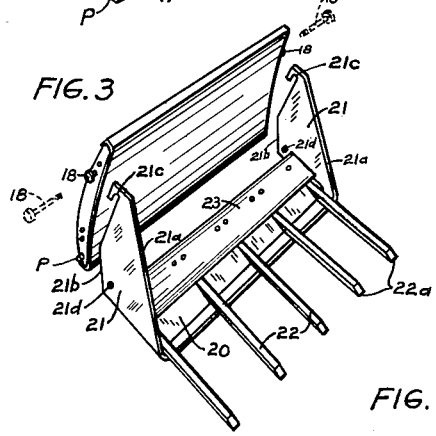
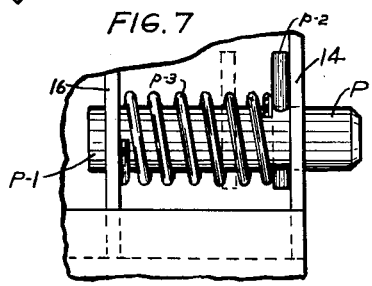
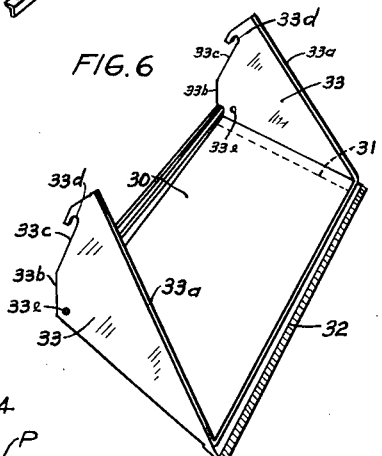
INVENTOR.
WALTER W. WOLFE
BY STANLEY R. WALSTROM
VERNON V. NASH
Williamson, Schroeder & Palmatier
ATTORNEYS

3,034,237
MULTI-FUNCTION ATTACHMENTS CARRIER FOR FARM LOADERS AND THE LIKE

Walter W. Wolfe, Mound, Stanley R. Walstrom, Minneapolis, and Vernon V. Nash, Hopkins, Minn., assignors to Superior Separator Company, Hopkins, Minn., a corporation of Delaware Original application Mar. 26, 1956, Ser. No. 573,720, now Patent No. 2,935,802, dated May 10, 1960. Divided and this application Apr. 6, 1959, Ser. No. 804,439

4 Claims. (Cl. 37—117.5)

This invention relates to farm loaders often called front end tractor loaders, and has particular relation to carriers or mountings at the outer end of such loader booms for supporting and connecting with the device a variety of different loader attachments such as manure forks, removable scoops, snowplows, bulldozers, and so forth, usually constituting a collecting medium for various types of material.

The instant application is a divisional application of co-pending application, Serial Number 573,720 filed March 26, 1956, now Patent Number 2,935,802, entitled "Multi-Function Attachments-Carrier for Farm Loaders and the Like."

Such farm loaders usually employ a pair of forwardly extending booms pivoted at their rear ends to the tractor frame at the main portion of the frame or points thereabove and extending forwardly and ahead of the tractor and terminating in connector means for various bucket attachments and collecting medium which can be utilized not only to collect the material, but to haul the same with the help of the tractor and to dump the same upon a pile at some removed point. In view of the wide variety of uses to which such machines can be put, it is desirable to provide attachments in the form of various types of buckets, collectors, manure forks, bulldozer blades, removable scoops, snowplows and the like.

It is an object of our invention to provide, in connection with such loaders, an attachment carrier which is mounted upon the forward ends of the boom, transversely thereof and having readily connectable means thereon for operatively securing in fast relationship, various of said attachments and furthermore, in its inherent construction having the dual function of providing a full device in itself as well as a back member for the several attachments utilized therewith.

A further object is the provision of attachment carriers of the type described which are inexpensive but rugged in structure and which make possible the very easy attachment without use of tools, of a number of different collector mediums for use with the loader and wherein the attachment carrier itself comprises one useful device and constitutes a portion (to wit, the back and frame) of a variety of simplified attachments which can be quickly secured thereto and used therewith.

Another object is the provision of an attachment carrier and frame back of the type described which may be utilized to readily connect with least effort, a variety of different attachments specially constructed for combinative uses therewith.

More specifically, it is an object to provide a combined attachment carrier, bulldozer blade assembly and rectangular reinforced backing frame for loader attachments contoured concavely on its forward face to act as a pushing medium and having efficient elements thereof to which the various attachments for the loader may be easily and readily attached without effort or special tools, as desired. In this connection, the said backed frame of our carrier serves not only with its cooperating securing means to provide for attachment of special attachments such as manure forks, tines, buckets, and removable scoops, but further enables other attachments to be built therearound in combination therewith, such as an extension bulldozer, extension scoops, forks or the like.

These and other objects and advantages of our invention will more fully appear from the following description made in connection with the accompanying drawings, wherein like reference characters refer to the same or similar parts throughout the several views and in which:

FIG. 1 is a front perspective view showing a type of farm loader applied to a tractor, the main portions of the tractor being broken away, the view showing the attachment of a scoop to the front ends of the boom through the medium of our improved attachment carrier;

FIG. 2 is a rear perspective view showing our attachment carrier detached from the tractor as viewed from the rear thereof and showing the various connecting elements for securing the attachments to the same;

FIG. 3 is a perspective view showing a manure fork attachment about to be applied and operatively secured to our attachment carrier to cooperate therewith in constituting the full manure fork bucket;

FIG. 4 is an end elevation of a form of our attachments carrier detached;

FIG. 5 is an exploded view showing the construction of a dozer extension assembly about to be coupled with our attachment carrier for constituting an extended and substantially wider dozer blade assembly;

FIG. 6 is a perspective view showing a removable scoop device which is adapted to be attached to and cooperate with our attachments carrier and back frame to constitute an operative scoop or collector medium;

FIG. 7 is a detail rear elevation of a corner of the body of the carrier illustrating the construction of one of the retractable lock pins; and FIG. 8 is a side elevation of an extended scoop assembly for traversing the full distance between the outer sides of the rear wheels of the tractor, including the extension frame and scoop elements assembled in working relation with our attachment carrier.

Referring now to the drawings, in FIG. 1 a scoop attachment device of the structure illustrated in detail in FIG. 8 is shown as operatively attached to the forward arms or booms of a farm loader attached to a conventional tractor T. The booms of the particular farm loader illustrated are pivoted at their rear ends upon a reinforced rear, upstanding frame including side posts 10. Said arms or booms extend forwardly from the pivoted ends thereof in boom sections 11a and have downwardly extending or angled forward ends 11 which terminate in aligned connector portions having bearing apertures or other connector means for attachment to buckets on or to our improved carrier frame.

Our multiple-function attachment carrier, as clearly shown in FIGS. 2 to 4 inclusive, comprises an upstanding rectangular body 12 which is made of durable material such as tough steel or boiler plate and which in the form shown, is bent rearwardly at its upper portion to form a top edge and reinforcing flange 12a and is bent, in similar manner inwardly and then upwardly at its lower edge to form the bottom edge and reinforcing flange 12b. The body 12 is formed into a slightly concavo-convex shape with its forward surface being concave, as clearly shown in FIGS. 3, 4 and 5. The carrier body 12 is reinforced by welding or other rigid attachment on its rear face of a plurality of parallel, edgewise reinforcing strips, the endmost of which are numbered 13 and 14 respectively, said strips being substantially flush with the end or side edges of the body 12. Inwardly disposed in parallel spaced relation from the end strips 13 and 14 are related reinforcing and mounting strips 15 and 16, respectively which also are edgewise disposed and rigidly secured to the rear surface of body 12. The ends of the several strips 13, 14, 15 and 16 are snugly accommodated and secured within the top and bottom reinforcing flanges 12a and 12b, respectively of body member 12, as clearly shown in FIGS. 2 and 4.

For pivotally connecting the forward ends of the depending arms or booms 11 of the farm loader with the lower portion of the back of body 12, suitable means are provided as shown, constituting upstanding plates 17 which may be welded to the back and lower portions of the carrier body spaced a short distance inwardly from the two heavy reinforcement strips 15 and 16, respectively. Pins 17a detachably mounted in said plates, pivotally connect and have their outer ends interposed in suitable sockets or bores appropriately formed in the strips 15 and 16, respectively. The forward ends of the loader booms 11a are confined between plates 17 and the respective reinforcement strips 15 and 16 and the pins 17a pivotally interconnect the booms with the carrier.

Provision is also made for connection of tilting means for the carrier and related collector devices which as shown comprise removable heavy pins 18 insertable from the upper portions of the side strips or ends 13, 14 of the body, and having pinned connection at their inner ends with sockets 15a and 16a transversely aligned with the apertures of the side plates or strips 13 and 14 respectively (see FIG. 2). The apertured outer extremities of tilt links or the pistons of hydraulic jacks J are engaged by the pins 18 and confined between the two pairs of spaced reinforcing strips 13, 15, and 14, 16 respectively.

Illustrated in detail in FIG. 7, and also shown in FIGS. 2 to 5 inclusive is a suitable, efficient securing and locking mechanism carried at each end of the attachment body and adjacent the lower edge thereof. The mechanism illustrated comprises for each end of the carrier, a heavy retractible pin P which is slidably mounted in aligned apertured portions of the appropriate series of upstanding, spaced reinforcing strips 13, 15 and 14, 16. Said pin at its inner end has an enlargement head $p-1$ and strip abutment means such as a cotter key or transverse pin $p-2$ disposed inwardly of the outside reinforcing strip 13 or 14 as the case may be. The locking pin P is urged outwardly by a coil spring $p-3$ which is interposed between the appropriate spaced upwardly extending reinforcing strip 15 or 16 as the case may be and the abutment pin $p-2$.

The upstanding carrier as previously described and as illustrated in FIGS. 2 and 4 attached to the forward arms 11 of the loader booms, of itself constitutes a pusher or bulldozer for the tractor. In this connection, if desired, a heavy lower leading edge plate 19 may be detachably affixed to the lower portion and front of body 12. Suitable bolt apertures are provided for receiving attachment bolts 19a. Our carrier, therefore, has a valuable use and function inherently without requiring attachment of other devices or elements.

The attachments carrier in addition, forms the support and the back and/or a portion of the back for a number or other loader attachments specially constructed for combinative use therewith.

In FIG. 3, a manure fork or bucket attachment is shown in position to be received by and secured to the carrier for use, while in FIG. 6 a special removable scoop is illustrated adapted for attachment to and support from the carrier in similar manner to the manure fork.

Referring to the manure fork of FIG. 3, this attachment structure comprises a flat metal bottom 20 integrally formed or otherwise rigidly secured to upstanding side members 21, said side members as shown, having rearwardly inclined forward edges 21a and vertical rear edges 21b which at their intermediate portions are inclined forwardly to assist in defining upper attachment and supporting hooks 21c which are adapted to slip over and engage the headed attachment pins 18 which project from the side edges of the carrier and are secured to the reinforcing strips 13, 15 and 14, 16 affixed to the back of body 12, the hooks being confined between the heads of pins 18 and the adjacent side surfaces of strips 13 and 14, respectively.

In effecting the attachment of the manure fork, scoop or other alternative attachment structures, the tractor with its booms lowered, may be easily driven to a position immediately behind the rear edges of the sides 21 of the manure fork until the headed attachment pins 18 are disposed just beneath the upper hooks 21c, whereafter the booms may be hydraulically lifted a short distance to automatically engage the hooks 21, thereby supporting the attachment device. Thereafter the attachment structure may be swung with power tilt cylinders or manually swung to properly align attachment apertures 21d at the lower rear corners of side plates 21 with the retractable spring-pressed pins P which are slidably carried at the lower ends of the two sets of cooperating reinforcing strips 13, 15 and 14, 16, respectively. Pins P are retracted, the outer ends thereof inserted in attachment apertures 21d in the side plates of the attachment device and thereafter released and projected by spring action to cooperate with the hook and pin engagement at the upper ends of the side plates of the device for locking the attachment device securely in place, at which time the marginal portions of the rear sides of plates 21 overlap in abutting relation with the ends or sides of the carrier and the rear edge of the bottom 20 of the attachment abuts against the lower edge of the forward face of body 12 of the carrier, the carrier and attachment device then constituting a complete bucket or collector medium.

In the manure fork of FIG. 3 a series of heavy metal tines 22 are secured (preferably detachably) to the upper side of the bottom 20 extending forwardly some distance beyond the forward edge of the bottom and terminating in beveled points 22a. In the form of fork shown, a top securing plate 23 is welded in spaced relation to bottom 20 and bears against the inner ends of tines 22 to assist in the reinforcing and securing of said tines. Bolts may be used to pull plate 23 and bottom 20 together, thereby clamping against the tines.

In FIG. 6 the special scoop structure which may be used for breaking up, collecting, elevating and dumping various materials including snow, comprises a heavy metal bottom 30 preferably reinforced by transversely extending end strips 31 welded or otherwise secured therebelow at the side edges thereof, and having a beveled and sharpened leading edge plate 32 secured beneath and to the forward edge of the bottom 30. Heavy metal side plates 33 are integrally formed or otherwise rigidly connected with bottom 30 extending upwardly in planes substantially perpendicular to the bottom and as shown, having rather sharply inclined (for example, at a 45 degree angle) forward edges 33a. Side plates 33 correspond in function and attachment provision with the side plates 21 of the manure fork described. They have short perpendicular rear edges 33b which merge into forwardly inclined upper portions 33c which assist in defining the upper attachment hooks 33d. These attachment hooks interfit with and may be coupled to the headed attachment pins 18 adjacent the upper portions of the side edges of the carrier. Likewise at their lower rear corners, attachment aperatures 33e are provided for interconnection with the retractable fastening pins P mounted at the lower portions of the side edges of the carrier device.

Referring now to FIG. 5 our bulldozer extension assembly is shown as it is being attached to our attachment carrier and in fact before the parts of the assembly itself are united. The carrier is utilized as the central, main portion of the assembled unit and as the support for the entire assembly.

The auxiliary structure comprises a pair of widely spaced back plates 35, contoured in concavo-convex shape similar to the body 12 of the carrier and reinforced at the side edges by edgewise disposed, reinforcing strips 36 and 37 respectively in each instance. The inner side strips 37 have apertures for interfitting with the retraction pins P. The plates 35, like the body 12 are turned or angled rearwardly at their upper and lower ends, forming the reinforcing flanges 35a and 35b, respectively, which surround the edges of the reinforcing strips 36 and 37.

An elongated, upper reinforcing and connecting angle bar 38 extending the full length of the overall assembly is provided with suitable apertures which register with bolt apertures in the top flange 12a of body 12 and a plurality of fastening means such as headed bolts are used to rigidly secure the auxiliary device to the upper longitudinal edge 12a of the carrier. Likewise, an elongated angle bar 39 extending the full length of the overall assembly is similarly attached to the lower flange 12b of the body and also, interconnects the lower edges 35b of the two plates 35, thereby completing the extension unit.

It will of course be understood that while FIG. 5 shows the auxiliary extension device before assembly thereof, that in actual use the assembly device in the form of a unit with the angle bars 38 and 39 rigidly interconnecting the two widely spaced plates or back portions 35 may be as a unit, detached from our carrier.

The assembled complete device or assembly comprises an extension bulldozer operatively connected with the forward portions of the booms of the loader and preferably is of an overall width equal to the maximum width between the outside of the rear wheels of the tractor.

In FIG. 8, a side elevation of an extension scoop assembly is shown. An attachment device made up of back sections 42 similar to the plates or back plates 35 of the dozer extensions are employed in the auxiliary device. The full extension scoop device assembled is shown mounted on the tractor in perspective view in FIG. 1 of the drawings. The auxiliary device includes a bottom section 40 of a length equal to the length of the body 12 of the carrier plus the additional lengths of back sections 42. It is rigidly connected at its rear edge with back sections 42. The additional lengths of bottom section 40 actually constitute auxiliary scoop bottoms for the auxiliary back sections 42, the portion of the bottom 40 approximating the length of body 12 cooperating with the latter to define an intermediate scoop portion. Bottom section 40 is preferably reinforced by transverse underlying bars 43 (see FIG. 8) which may be welded to the underside thereof. The upper edges of auxiliary back sections 42 are rigidly secured together in widely spaced relation by a top angle bar 44, said back sections 42 and bottom 40 leaving an elongated rectangular opening for accommodating the carrier body 12. Intermediate portions of the upper angle bar 44 are bolted or otherwise rigidly secured to the upper turned flange of the body 12. A lower angle bar 45 reinforces the bottom and rear of the auxiliary attachment, and may be bolted rigidly to the rear turned edge 12b of the carrier body. It will be noted that each back section 42 is provided with an upstanding reinforcing and attachment strip 14a having a hook shaped upper end 14b. These upstanding reinforcing and attachment strips 14a cooperate with pins 18 and locking pin P to readily mount the extension scoop assembly on the body 12.

Thus, as illustrated in FIG. 1, with our attachments carrier as the foundation and supporting and mounting medium, a very wide extension scoop device may be provided through the cooperation of the carrier body 12, as shown with the extension open framework device just described. The extension scoop device is preferably of an overall width equal to the full width of the tractor between the outside of the two rear wheels, in actual practice having a width of approximately eight feet.

From the foregoing description it will be seen that we have provided a very rugged, simple and highly efficient attachments carrier for farm loaders and the like adapted to be very readily attached to the forward ends of the booms of the carrier and serving in itself as a bulldozer or pushing unit. The same carrier or body constitutes for several attachments, the support and the back of the assembled attachments device. It provides also at its side edges, readily attachable or coupling means for securing the sides of open backed attachment elements to make up assemblies for various collector and dumping devices.

It will of course be understood that various changes may be made in the form, details and proportions of the parts without departing from applicants' invention.

What is claimed is:

1. A multi-function attachments-carrier and an extension attachment for and in combination with elevating type farm loaders having in combination a generally rectangular upstanding carrier body having reinforced side edges and having quick coupling means for attachment in a transverse position forwardly of and to the forward end of the loader in upstanding position and functioning as the main back member of the attachment and also functioning independently as a bulldozer, and an extension attachment comprising when assembled, an elongated generally rectangular frame consisting in spaced upper and lower reinforcing bars attached to the respective upper and lower edges of said carrier body and widely spaced upstanding back panels conforming in shape to the forward contour of said carrier body, the inner edges of said back panels being spaced apart for juxtaposition against the reinforced side edges of said body, and means for quickly securing said extension attachment to said body.

2. A multi-function attachments-carrier and an extension attachment for and in combination with elevating type farm loaders of the boom type having in combination a generally rectangular upstanding carrier body having quick coupling reinforced side edges and having means for attachment in a transverse position forwardly of and to the outer end of the loader in upstanding position, the forward surface of said body being concave in vertical section and said body functioning as the main back member of the attachment and also independently as a bulldozer, and an extension attachment comprising an elongated, generally rectangular frame consisting in spaced upper and lower reinforcing bars attached to the respective upper and lower edges of said carrier body and projecting beyond the same and consisting also in widely spaced, upstanding back panels conforming in concave shape to the forward contour of said carrier body, the inner edges of said back panels being spaced apart for engagement against the reinforced side edges of said body, said back panels then constituting lateral extension of said body and means for quickly securing said extension attachment to said body.

3. The structure set forth in claim 2 wherein said lower reinforcing bar constitutes a unitary lower edge for the assembled body and said extension attachment, said assembly constituting a bulldozer.

4. Multi-function attachment carrier and extension attachment for elevating type farm loaders having in combination, a general rectangular attachment-supporting member and having quick coupling means for attachment in a transverse position forwardly of and to the forward end of the loader and having a normally upright body functioning as the main back member of an attachment, a scoop collector member detachably mounted on said attachment-supporting member and including a bottom section having a width greater than the width of said attachment-supporting member, said scoop collector member including an elongate generally rectangular back frame consisting in spaced upper and lower reinforcing bars attached to the respective upper and lower edges of said attachment-supporting member and also comprising widely spaced upstanding back panels conforming in shape to the forward contour of said attachment-supporting member, said back panels being rigidly connected with said bottom section, the inner edges of said back panels being spaced apart for juxtaposition against the side edges of said attachment-supporting member, and readily disconectible means adjacent the lower portion of the sides of said attachment-supporting member for attachment with the inner edges of said back panels.

References Cited in the file of this patent

UNITED STATES PATENTS

| | | |
|---|---|---|
| Re. 24,453 | Ess | Apr. 8, 1958 |
| 1,568,439 | Baxter | Jan. 5, 1926 |
| 2,447,150 | Andersen | Aug. 17, 1948 |
| 2,529,208 | Andersen | Nov. 7, 1950 |
| 2,718,719 | Anderson | Sept. 27, 1955 |
| 2,841,894 | Valois | July 8, 1958 |

OTHER REFERENCES

"Davis Hydraulic Loader for Ferguson Tractors," Model 100, received from: Mid-Western Industries, Inc., 1009 South West Street, Wichita, Kansas, Aug. 26, 1953.